3,135,771
Patented June 2, 1964

3,135,771
ESTERS OF AZIDO-ACETIC ACID WITH CHLORINATED PHENOLS
Gustav Renckhoff and Rudolf Junghaehnel, Witten (Ruhr), and Wolfgang Wolfes, Witten-Bommern, Germany, assignors to Chemische Werke Witten G.m.b.H., Witten (Ruhr), Germany
No Drawing. Filed Apr. 30, 1962, Ser. No. 191,315
Claims priority, application Germany May 2, 1961
4 Claims. (Cl. 260—349)

The present invention is directed to a new and improved bactericide, fungicide and/or insecticide, and more specifically, to a compound containing azido-acetic acid esters of chlorinated phenols as the active material for use as a bactericide, gungicide, and/or insecticide.

It is known that pentachlorophenol is an extremely active, easily accessible preservation agent for many uses and purposes. Pentachlorophenol is utilized, particularly, in the treatment and preservation of wood, cellulose material and textile goods. Pentachlorophenol is also used successfully for combating slime formation in the paper industry, for the conservation of glues and emulsifier colors, and for the protection of dyes, paints and lacquers against fungus development. Pentachlorophenol, however, has such disadvantages as a relatively high volatility and the compound exerts a strong irritating effect on the mucous membranes. Also, the imperfect stability against watering and the sensitiveness of the compound against exposure to ultraviolet light prevent utilization of pentachlorophenol in some fields of application.

It has already been attempted to overcome these drawbacks in the use of pentachlorophenol by producing numerous derivatives. Thus, a great number of different salts with metals or organic bases have ben proposed as substitutes. Because of their easy hydrolyzability, however, their stability is still unsatisfactory.

It has also been attempted to eliminate the disturbing properties of pentachlorophenol by esterification or etherification of the free hydroxyl group. All of the heretofore proposed derivatives, however, either show a considerable drop in the bactericidal and fungicidal effect, as compared to the free pentachlorophenol, or their volatility is only slightly reduced.

It has now been found that the heretofore unknown azido-acetic acid esters of chlorinated phenols, particularly the azido-acetic acid ester of pentachlorophenol, represent excellent bactericides, fungicides and insecticides which surprisingly show the same high effectiveness as the free pentachlorophenol without, however, possessing the disadvantageous effects of the latter, such as high volatility, irritating effect on the mucous membranes, easy removability with water and sensitivity against ultraviolet radiation.

It is an object of the present invention, therefore, to provide as new compounds for use as a bactericide, fungicide, and/or insecticide the azido-acetic acid esters of chlorinated phenols.

Other objects will become apparent as the present description proceeds.

The preparation of the new compounds may take place, for example, by the reaction of pentachlorophenol with azido-acetic acid chloride under the addition of triethylamine in acetone as the solvent. The resulting azido-acetic acid ester of pentachlorophenol is a crystalline compound which melts at 101° C., is soluble in organic solvents, such as acetone, alcohol, white spirit, and insoluble in water. It is advantageously used, instead of pentachlorophenol, in all those instances where the above-mentioned properties of pentachlorophenol are disadvantageous, particularly for the conservation of textiles and in wood-preserving agents.

The new compounds may be used either as a powder, mixed with inert substances, or also with other active substances. It may, however, also be used in aqueous dispersion or dissolved in solvents, or in any other known forms of usage. Since particularly the azido-acetic acid ester of pentachlorophenol has the same high effectiveness as the free pentachlorophenol, it is used in the same concentrations as the latter, but frequently the quantities used may also be lower since there is no need for overdosing because of the good stability for obtaining a sufficiently long effectiveness.

The following examples serve to illustrate the production of the azido-acetic acid esters of chlorinated phenols of the present invention and their effectiveness as germicidal agents.

*Example I*

26.6 parts by weight of pentachlorophenol and 11.0 parts by weight of triethylamine are dissolved in 70 parts by volume of acetone. While cooling at a temperature of from 0 to 5° C., the solution of 12 parts by volume of azido-acetyl chloride in 30 parts by volume of acetone is dropped into that solution while stirring. After additional stirring for 2 hours, the resulting azido-acetic acid ester of the pentachlorophenol is filled up with water and purified by recrystallization with diluted acetone.

Yield: 29.6 parts by weight corresponding to 85% of the theory; Melting point: 101° C.

*Example II*

47 parts by weight of 2,3,4,6-tetrachlorophenol and 34 parts by weight of triethylamine are dissolved in 200 parts by volume of acetone. Under cooling to 0–5° C., a solution of 24 parts by weight of azido-acetyl chloride and 60 parts by volume of acetone is dropped in while stirring. When the addition is completed, stirring is continued for another hour at room temperature and the resulting azido-acetic acid ester of the tetrachlorophenol then precipitated by addition of water. The yield amounts to 80% of the theory.

By recrystallization from diluted acetone, the compound may be obtained in fine white little needles having a melting point of 66.5–67° C. and a chlorine content of 45.2% (calculated: 45.1%).

*Example III*

40 parts by weight of 2,4,6-trichlorophenol and 34 parts by weight of triethylamine, dissolved in 200 parts by volume of acetone, are reacted slowly while stirring with a solution of 24 parts by weight of azido-acetyl chloride in 60 parts by volume of acetone while cooling. Subsequently, stirring is continued and the resulting azido-acetic acid ester of trichlorophenol precipitated by the addition of water. The yield amounts to about 82% of the theory. After recrystallization from diluted acetone, the azido-acetic acid ester of 2,4,6-trichlorophenol is obtained in fine, white, brilliant laminae which melt at 68–69.5° C., and have a chlorine content of 37.0% (calculated: 37.8%).

0.6% of the ester produced according to Example I completely arrests the growth of bacterium coli in the meat agar. An addition of less than 0.0024% to meat agar results in the complete arrest of growth of staphylococcus. Under the same experimental conditions, the same effective concentrations are determined in free pentachlorophenol. The esters produced according to Examples II and III are also similarly effective.

Textile samples (unbleached or nettle cotton cloth) were impregnated with an acetone solution with 0.5% of the azido-acetic acid ester of Example I. When subjected to the mildew test, they were found to be completely mildew-free according to test DIN 53931. The same effects were observed even after the samples had been watered twice for 15 hours in running water. Also, after a two-day storage in the vacuum drying closet or chamber at 40° C. under 10 torr or after a two-hour UV-irradiation under the analysis quartz lamp, the mildew resistance according to DIN 53931 was still completely preserved. The products of Examples II and III are also especially effective in protecting textiles. As a comparison, textile samples which had been treated with 0.5 and 1% pentachlorophenol and, respectively, 0.5% chloroacetic acid ester of pentachlorophenol were subjected to the same tests. While these latter textile samples were at first equally mildew-resistant, both the fabric impregnated with 0.5% and that impregnated with 1% pentachlorophenol were completely overgrown with mildew or mold fungus after storage in vacuo at 40° C. Also, the fungicidal effect of the chloroacetic ester had completely disappeared after storage in vacuo. Also, with regard to the above-described watering and UV-irradiation, these impregnations were not durable.

A solution of a linseed oil alkyl resin in white spirit was reacted with 5% of the azido-acetic acid ester from pentachlorophenol, produced according to Example I, whereby the ester was dissolved clear. Small pinewood boards sized with this solution resulted (were found to be) resistant against the attack of the blue fungus even after prolonged weathering. The azido-acetic acid esters of the present invention are also effective as bactericides, etc., in lacquers, on paper, leather, etc.

The above description and examples serve to illustrate the invention and are not intended to limit the same.

We claim:

1. A compound of the formula

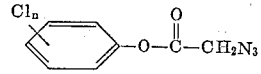

wherein $n$ is a full number from 1 to 5.

2. The azido-acetic acid ester of pentachlorophenol.
3. The azido-acetic acid ester of 2,3,4,6-tetrachlorophenol.
4. The azido-acetic acid ester of 2,4,6-trichlorophenol.

References Cited in the file of this patent

UNITED STATES PATENTS

| | | |
|---|---|---|
| 2,971,884 | Gruenhagen | Feb. 14, 1961 |
| 2,994,637 | Bimber | Aug. 1, 1961 |
| 3,030,388 | Moore et al. | Apr. 17, 1962 |
| 3,036,094 | Meiser | May 22, 1962 |